(12) United States Patent
Grohs et al.

(10) Patent No.: US 12,373,631 B2
(45) Date of Patent: Jul. 29, 2025

(54) SYSTEMS, METHODS, AND DEVICES FOR A FORM CONVERTER

(71) Applicant: Nintex UK Ltd, London (GB)

(72) Inventors: Randall E Grohs, Bellevue, VA (US);
Carl Hickton, Bellevue, WA (US);
Josephine Ann Gabrielle Ortiz,
Bellevue, WA (US)

(73) Assignee: Nintex UK Ltd., London (GB)

( * ) Notice: Subject to any disclaimer, the term of this patent is extended or adjusted under 35 U.S.C. 154(b) by 0 days.

(21) Appl. No.: 17/961,768

(22) Filed: Oct. 7, 2022

(65) Prior Publication Data
US 2023/0046344 A1    Feb. 16, 2023

Related U.S. Application Data

(63) Continuation of application No. 17/397,374, filed on Aug. 9, 2021, now abandoned.

(51) Int. Cl.
*G06F 40/103* (2020.01)
*G06V 30/412* (2022.01)
*G06V 30/416* (2022.01)
*G06V 30/10* (2022.01)

(52) U.S. Cl.
CPC .......... *G06F 40/103* (2020.01); *G06V 30/412* (2022.01); *G06V 30/416* (2022.01); *G06V 30/10* (2022.01)

(58) Field of Classification Search
CPC .. G06F 40/103; G06V 30/416; G06V 30/412; G06V 30/10
See application file for complete search history.

(56) References Cited

U.S. PATENT DOCUMENTS

| | | | |
|---|---|---|---|
| 2004/0049735 A1* | 3/2004 | Tsykora | G06F 40/103 715/234 |
| 2006/0074981 A1* | 4/2006 | Mauceri | G06F 40/154 |
| 2007/0206884 A1* | 9/2007 | Kato | G06V 30/262 382/229 |
| 2010/0174985 A1* | 7/2010 | Levy | G06F 40/163 715/244 |

(Continued)

FOREIGN PATENT DOCUMENTS

CA    2832724 A1 *  5/2014  ............. G06F 17/00

OTHER PUBLICATIONS

Hadjar, Karim, et al. "Xed: a new tool for extracting hidden structures from electronic documents." First International Workshop on Document Image Analysis for Libraries, 2004. Proceedings . . . IEEE, 2004. (Year: 2004).*

(Continued)

*Primary Examiner* — Shahid K Khan
(74) *Attorney, Agent, or Firm* — Perkins Coie LLP

(57) ABSTRACT

Methods, systems, and devices for automatically converting a static electronic file format and its various elements into a dynamic digital form with executable elements that can be customized before being used. The resulting digital form is compatible with digital workflows and processes. The disclosed systems, methods, and devices go beyond simply extracting data from the original electronic file format and instead enable users to, without using code, convert the source form into a dynamic, malleable digital form while still retaining the source form's original purpose and functionality.

20 Claims, 14 Drawing Sheets

(56) References Cited

U.S. PATENT DOCUMENTS

| | | | |
|---|---|---|---|
| 2011/0091092 A1* | 4/2011 | Nepomniachtchi | G06Q 20/042 382/137 |
| 2013/0085935 A1* | 4/2013 | Nepomniachtchi | G06Q 20/387 705/40 |
| 2013/0259377 A1* | 10/2013 | Goktekin | G06V 30/414 382/176 |
| 2015/0012805 A1* | 1/2015 | Bleiweiss | G06F 40/134 715/205 |
| 2018/0285332 A1* | 10/2018 | Aghaiipour | G06F 40/174 |
| 2019/0050639 A1* | 2/2019 | Ast | G06F 40/30 |
| 2019/0179885 A1* | 6/2019 | Wong | G06F 40/174 |
| 2019/0294641 A1* | 9/2019 | Alexeev | G06V 10/82 |
| 2021/0012102 A1* | 1/2021 | Cristescu | G06F 40/284 |
| 2022/0012414 A1* | 1/2022 | D'Oria | G06F 16/16 |

OTHER PUBLICATIONS

Hanumanthappa, M., and Deepa T. Nagalavi. "Identification and extraction of different objects and its location from a Pdf file using efficient information retrieval tools." 2015 International Conference on Soft-Computing and Networks Security (ICSNS). IEEE, 2015. (Year: 2015).*

* cited by examiner

ABCXYZ Insurance Company
ABCXYZ Life Insurance Company

Disability Claim Form

ABCXYZ Life Insurance Company

MAIL PROCESSING CENTER, P.O. BOX 12345  CITY, ST, 99999-4444  TOLL-FREE ( ) -  FAX ( ) -

Email: Health.Insurance@ABCXYZinsurance.com

FAILURE TO COMPLETE THE ATTACHED AUTHORIZATION WILL REQUIRE THE FORM TO BE RETURNED TO YOU FOR COMPLETION

PART1 - TO BE COMPLETED BY THE EMPLOYEE OR CLAIMANT

1. Claimant's Full Name and Complete Address     Telephone Number and Email Address 2. Name of Claimant's Employer     3. Certificate Number 4. Sex  ○Male  ○Female  | 5. Date of Birth | 6. status  ○Married  ○Single 7. Explain the nature of the sickness or injury.    was it work related?  ○Yes  ○No 8. Date you became unable to work at your occupation because of disability:

9. On what date were you first treated by a physician for this disability?

10. Physician(s) consulted during present illness or injury.
Name:       Address:
Period Treated   From:         To:

I certify that the information provided above is true and correct.

Signature         Date

PART2 TO BE COMPLETED BY THE CLAIMANT'S EMPLOYER

1. Job Title of Claimant | Date Employed | Annual Salary

2. List Job Duties:

3. Prior to disability, did you consider your employee able to perform
   ○ Sedentary Work Lift 10lbs. Maximum and occasionally carry small objects
   ○ Light Work: Lift 20lbs. ,maximum and frequently lift/carry up to 10lbs.
   ○ Medium Work: Lift 50lbs. maximum and frequently lift/carry up to 25lbs.
   ○ Heavy Work: Lift 100lbs. maximum and frequently lift/carry up to 50lbs
   ○ Very Heavy Work: Lift in excess of 100lbs. and frequently lift/carry up to 50lbs.

4. How has Employee's disability interfaced with the performance of his/her job?

5. Date last worked
6. When did employee return to work?
7. If not back at work, when do you expect the employee to return?

Signature         Date

SYSTEMS, METHODS, AND DEVICES FOR A FORM CONVERTER

CROSS-REFERENCE TO RELATED APPLICATION(S)

This application claims benefit to U.S. Non-Provisional application Ser. No. 17/397,374 filed on Aug. 9, 2021, the contents all of which are incorporated by reference herein as though set forth in their entirety, and to which priority and benefit are claimed.

FIELD OF USE

The present disclosure relates generally to the field of electronic-document creation, and more specifically, to systems, methods, and processes for automatically converting an electronic file format into a dynamic digital form that can be edited, completed, and/or integrated with digital workflows and processes.

BACKGROUND

An electronic file format is used to present information in a reliable manner that is independent of software, hardware, or operating systems. Common types of electronic file formats include PDFs (portable document format); JPEGs (joint photographic experts group); and word-processor documents. Electronic file formats usually consist of a combination of text and images and may also contain interactive elements such as links, buttons, and form fields. They can be an integral part of document-based and paper-based processes. For example, a PDF may be printed, completed by hand, and then sent back either physically or electronically after scanning; or it may be electronically completed and then electronically sent back online, offline, or a combination of both. Additional examples of electronic file formats include but are not limited to: PNG (portable network graphics); GIF (graphics interchange format); SVG (scalable vector graphics); and TIFF (tag image file format).

Although electronic file formats are reliable for exchanging information, significant limitations are becoming more apparent as organizations transition to a more digitized approach for addressing reoccurring tasks and problems. For example, an organization seeking to create a digital form of a PDF copy of a scanned document will have to manually create it from scratch—which requires reading the entire document, manually typing all text, and creating individual fields, one at a time, while ensuring that no errors are made. Or a company seeking to analyze information found on PDFs will have to review each individual document and then compile the data. And though technology exists to extract data from PDFs and other electronic file formats, that technology is focused only on receiving and analyzing high-quantity copies of the same form. Notably, electronic file formats do not provide the capability for software to differentiate between text that is merely informative and text associated with a form field. Another significant limitation is an electronic file format's incompatibility with workflows and electronic processes; for example, workflows and processes cannot interact with PDFs, and a PDF does not allow for its data to be in a format where a workflow or process can simply derive the data. Nor can the components of a PDF be customized without code or manually recreating the document from scratch—a tedious and time-consuming process.

Thus, what is needed are systems, methods, and devices for automatically converting a static electronic file format (referred to herein for convenience as a "source form") into a dynamic digital form that can be customized before being used. The resulting digital form should be compatible with digital workflows and processes and its data should be easily derived. Such systems, methods, and devices should go beyond simply extracting data from the source form and instead enable users to, without using code, convert a source form into a dynamic, malleable digital form while still retaining the source form's original purpose and functionality.

SUMMARY OF THE DISCLOSURE

The following presents a simplified overview of the example embodiments to provide a basic understanding of some embodiments of the present disclosure. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

As organizations evolve and digitize their workflows and processes, they often find themselves wanting to convert large sets of non-digital files used for collecting information, such as PDFs, into dynamic digital forms—which requires experience in coding and creating the digital forms from scratch. The disclosed form converter (also referred to herein as "Converter" for ease of use) solves this problem by automatically converting an electronic file format (source form) into a digital form that can be further revised or customized and integrated into digital workflows and processes. The Converter saves a significant amount of time and resources by making the conversion automatic and accomplishes this without requiring experience with code—a significant benefit to non-technical users wanting to quickly create digital forms. It enables organizations to not rely solely on paper documents and enables workflows and processes to not rely on non-digital documents; in some cases, removing the barrier to entry or reliance on documents and paper altogether. This also cuts back or eliminates associated costs (printing and mailing costs); time required for handling paper documents (printing, distribution, scanning); and susceptibility to errors (filling out by hand requires scanning documents or reading handwriting). The Converter improves the efficiency of computers by significantly reducing the time needed to convert to a digital form, by enabling a user to adjust the conversion process by fine tuning the parameters for converting, and by equipping users to edit and finalize the resulting digital form.

In a preferred embodiment, the Converter receives an electronic file format that comprises one or more elements—the one or more elements comprise one or more of a form field, a form-field label, or a standalone text block. The Converter detects the elements of the electronic file format and extracts them for use as a reference point when generating the digital form but primarily for converting them into a format appropriate for the resulting digital form. Once the elements are detected and extracted, the Converter scales the electronic file format to identify the location of the elements (though scaling doesn't have to occur at this time and can, instead, occur at any time before generating the digital form). The Converter converts the extracted elements into one or more of a converted form field, a converted form-field label, or a converted standalone text block (referred to herein as "converted one or more elements"). The converted form field is the equivalent of the original form field, but in a format compatible with the resulting digital form. The same is true for the converted form-field label, the converted standalone text block, and any other element or object extracted from the electronic file format and converted for placement into the digital form. After the Converter converts the elements, it generates the digital form, wherein the digital form comprises the converted elements, wherein the converted elements have a location resembling the location of the detected one or more elements of the electronic file format.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As will be realised, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The accompanying drawings, which are incorporated in and constitute a part of this specification, illustrate embodiments of the disclosure and together with the general description of the disclosure given above and the detailed description of the drawings given below, serve to explain the principles of the disclosure. In certain instances, details that are not necessary for an understanding of the disclosure or that render other details difficult to perceive may have been omitted.

FIG. 10 generally illustrates a form converter converting elements of an electronic file format to a digital form, as disclosed herein.

FIG. 11 generally illustrates a form converter enabling user interaction for converting elements of an electronic file format to a digital form, as disclosed herein FIG. 12 generally illustrates a form converter enabling user interaction for converting elements of an electronic file format to a digital form, as disclosed herein.

DETAILED DESCRIPTION OF EMBODIMENTS

Figure 1:
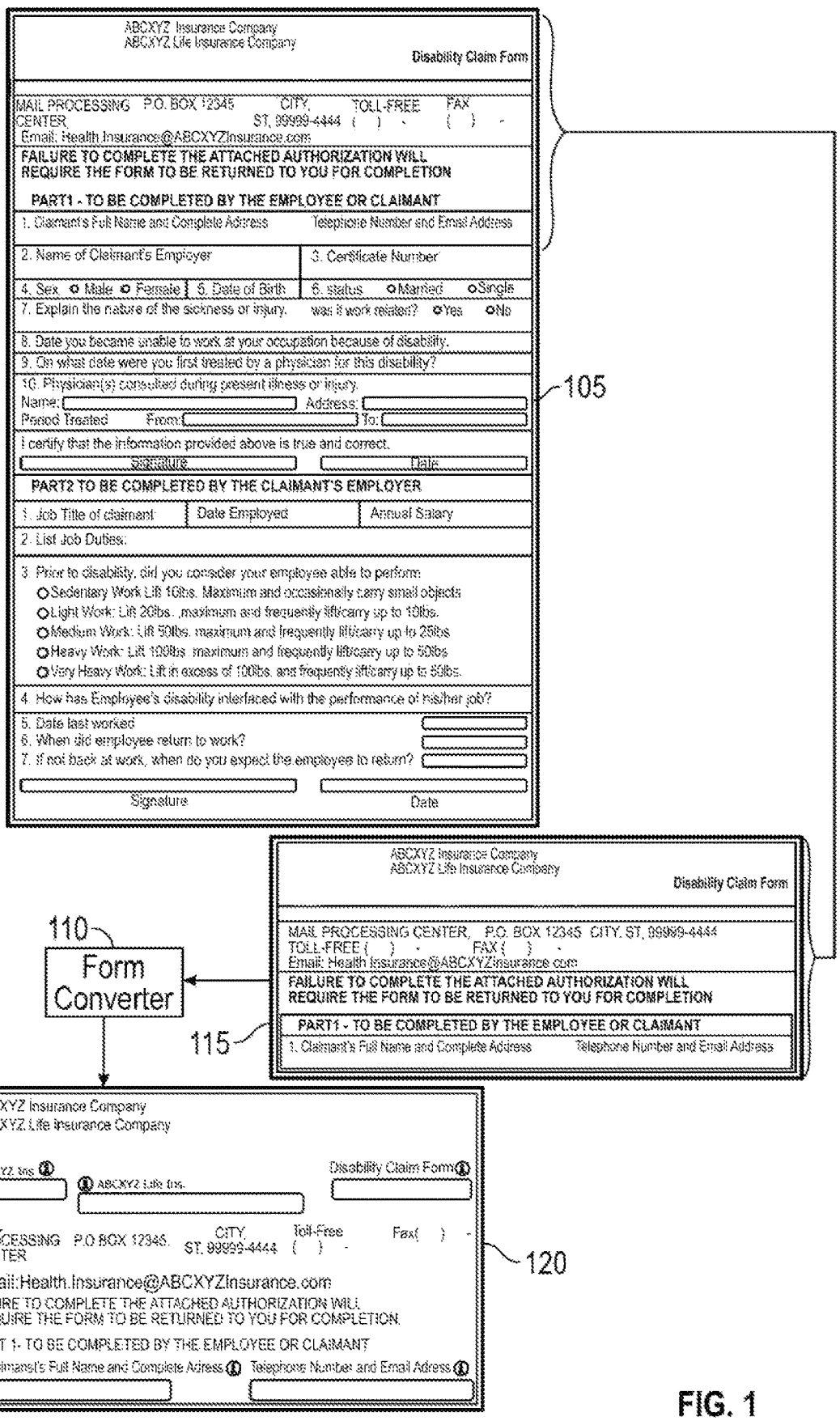
FIG. 1 generally illustrates an embodiment of a form converter as disclosed herein.

Before the present systems and methods are disclosed and described, it is to be understood that the systems and methods are not limited to specific methods, specific components, or to particular implementations. It is also to be understood that the terminology used herein is for the purpose of describing particular embodiments only and is not intended to be limiting. Various embodiments are described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Automatically converting an electronic file format to a digital form requires addressing the unique challenges resulting from the different types and varying elements of electronic file formats. Regardless of the form of the electronic file format (e.g., PDF or JPEG), there are two general types of electronic file formats: tillable forms and non-fillable forms. Fillable forms are completed electronically (e.g., filled out online or through a software program) and contain individual text elements and form fields. Non-fillable forms cannot be completed electronically and instead are completed by hand, such as after being printed out. (Note that when scanned, both fillable and non-fillable forms become images wrapped in a PDF file.) There are three primary elements of an electronic file format: form fields, form-field labels, and standalone text blocks. A form field serves to obtain data and is often represented by areas in an electronic file format, such as boxes or lines, where a user inputs information. A form-field label serves to provide information relevant to the form field and is often represented by informational text or images directly linked to a specific form field. A standalone text block serves to provide information not directly relevant to a form field and is often represented by text or images.

When converting an electronic file format into a digital form, the types of files and their varying elements create issues and problems not previously resolved. For example, though the three primary elements may seem straightforward, a PDF file, whether fillable or non-fillable, does not expressly differentiate between portions, such as a body of text, functioning as a form-field label as opposed to a standalone block. Rather, it is up to the individual person to identify the text's location and use visual cues (e.g., lines, boxes, relative positioning) to determine the functional use and purpose of the various parts—thus deciphering the PDF's purpose and what information it seeks to obtain or provide. So, converting any PDF file requires differentiating between the elements. Also, converting a PDF of a scanned copy—which is simply images inside a PDF wrapper—requires a different approach than converting a fillable or non-tillable form. Similarly, the approach for converting varies between tillable and non-fillable forms.

The disclosure herein considers the different types and elements of electronic file formats and adjusts accordingly. As set forth in the following embodiments, the Converter supports both fillable and non-fillable types as well as scanned copies of either type. And the Converter differentiates between form fields, form-field labels, and standalone blocks. As a result, the Converter can convert electronic file formats into dynamic digital forms; after which a user may then interact with the digital form to customize, such as by adding and removing content, specifying destination-field types in the conversion, or overriding predictions made by the Converter.

FIG. 1 generally illustrates an embodiment of a form converter as disclosed herein. In one embodiment, a source form 105 is accepted by a form converter 110, wherein the form converter 110 converts the source form 105 into a digital form. The form converter 110 converts the various elements of the source form 105—such as its form fields, form-field labels, and standalone boxes (collectively, 115)—into a digital file 120. The digital file 120 reflects the various elements 115 of the source form 105. As shown in FIG. 1, the digital file 120 displays the header, title, and fields asking for an individual's name, address, telephone number, and email address sections found in the electronic file format 105. But instead of the original elements 115 in static form, the digital file 120 now contains dynamic form-field labels 125 with corresponding executable form fields 130 as well as standalone boxes 135.

Figure 2:
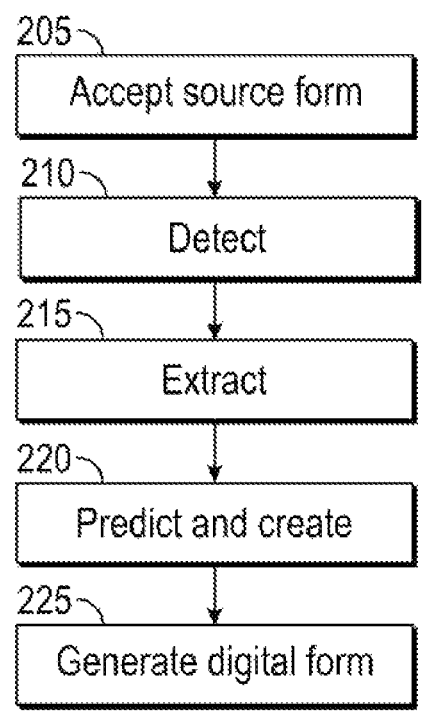
FIG. 2 generally illustrates an embodiment of a method for converting an electronic file format to a digital form as disclosed herein.

FIG. 2 generally illustrates an embodiment of a method for converting an electronic file format to a digital form as disclosed herein. As shown in FIG. 2, an overview of a method for a form converter to convert a fillable or non-fillable source form to a digital form comprises the Converter accepting 205 a source form, detecting 210 one or more elements of the source form (such as text or images), and extracting 215 those detected elements. With the various elements extracted, the form converter can predict and create 220 a digital form that comprises the detected elements—fillable forms, fillable-form labels, and standalone boxes—from the source form. Once all the elements have been extracted and their corresponding parts created, the form converter generates 225 a dynamic digital form resembling the source form that can be added to or its elements removed.

Figure 3:
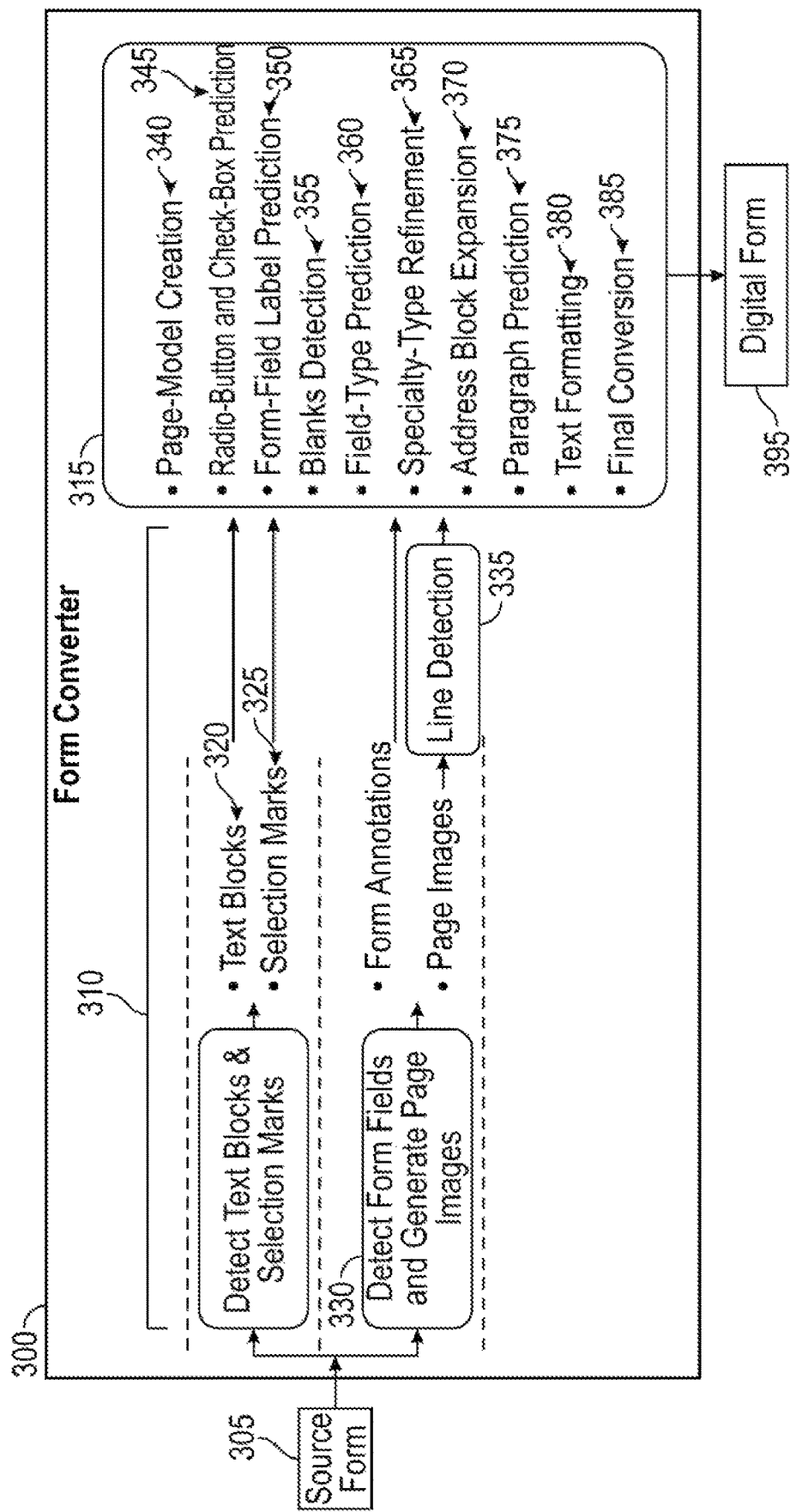
FIG. 3 generally illustrates an embodiment of a flowchart of a method for converting an electronic file format to a digital form, as disclosed herein.

FIG. 3 generally illustrates an embodiment of a flowchart of a method for converting an electronic file format to a digital form, as disclosed herein. As shown in FIG. 3, a form converter 300 may convert a source form 305 into a digital file 395 by first detecting and extracting 310 one or more elements. Depending on whether the source form is a tillable or non-fillable form, the extracted elements may comprise text blocks, selection marks, form annotations, and/or images. Following extraction, the form converter predicts what elements should make up the digital form, and then uses those predictions to create the various elements in a format that is compatible with a digital form. Through this method, the form converter creates a digital form capable of user-interaction that accomplishes the same purpose of the source form.

The form converter may use text-block extraction 320 for converting fillable/non-fillable forms to derive a common denominator—meaning, the form converter uses the text-block extraction to standardize the format/encoding of the text elements regardless of whether the document is a fillable or non-tillable file. A text block may be defined as a collection of text lines that are left-justified to a common x-coordinate, are of similar height to each other (similar font size), and are equally spaced vertically from each other. For fillable forms, the Converter extracts text directly from the form. For non-fillable forms, the text-block extraction process uses optical character recognition to extract text from embedded images. Through the text-block extraction, the Converter obtains a uniform, standardized set of text line elements along with their location on the file. One embodiment of an optical-character-recognition service/mechanism is using a form-recognizer layout web-service API, which reads the source form and returns a set of text objects along with their location on the page. The Converter may further refine the returned set of objects, such as by identifying whether the object is a checkbox.

The form converter may use selection-mark detection 325, a type of form-field extraction, for converting non-fillable source forms. The Converter may use form-recognizer layout web-service API that reads the source form and returns a set of selection marks along with their location on the page. Selection marks may be indicated on the page for either a source form's radio buttons or checkboxes.

The form converter may carry out form-field extraction 330 through the use of data libraries. Through the detection process, the form converter may also generate page images. Because non-tillable forms do not contain form-field elements, the form converter will usually detect form-fields in only fillable forms. For fillable forms, the Converter may use the extracted form-fields to establish digital-form controls and then look for text blocks that are nearby. If there are multiple text blocks nearby, the form fields sometimes contain additional information such as alternate text or the name of the form field, useful in helping identify which text block is more likely to be its label based on similarities.

For non-fillable forms (whether it is a PDF, JPG, PNG, TIFF, or a word-processor document), the Converter may use line detection 335 to detect and differentiate between various elements. Line detection generally refers to computer-vision algorithms that use images of each source-form page to detect sets of line-based objects on a page, such as horizontal standalone lines, vertical standalone lines, and rectangles. The form converter may then use each of these object types in different ways to help differentiate between standalone text and form-field labels.

Through its page-model creation functionality 341, the Converter, regardless of which type of source form (e.g., PDF v. JPEG; fillable v. non-fillable) is being converted, scales the source form to detect the location of the form's elements and generates an intermediate page-model as a collection of all the detected elements, which may include text blocks, selection marks, form annotations, page images, and detected lines. Scaling by the Converter will vary with the format and/or coordinate systems of the source form and the images and elements within the source form.

Through its radio-button and checkbox prediction functionality 345 (usually used on non-fillable forms because fillable forms explicitly contain checkboxes and radio buttons), the Converter examines selection marks and text blocks to do one or more of the following: (i) detect text blocks that directly overlap with the selection mark and have the letter O in them (providing a hint that the selection mark is actually a radio button, not a checkbox) and differentiating between the two; (ii) filter out the text blocks containing the overlapping O characters so they don't get added as individual elements; (iii) identify nearby text blocks that should be correlated to each selection mark and regarded as that mark's form-field label (applicable to both checkboxes and radio buttons); and (iv) identify nearby text blocks that should be an overall "choice" form label in the case of radio buttons.

The form-field label prediction functionality 350 varies depending on whether the source form being converted is fillable or non-fillable. Both algorithms attempt to predict which text blocks are standalone and which ones are form-field labels based on their relative location to other objects on the page. For fillable forms, the Converter uses the extracted form fields to establish digital-form controls and then searches for text blocks that are nearby. If there are multiple text blocks nearby, the form fields may contain additional information, such as alternate text or the name of the form field, that is useful in identifying which text block is more likely to be its label based on similarities. For non-tillable forms, the Converter uses nearby standalone horizontal lines and rectangles to determine which text blocks are more likely to be form-field labels v. standalone texts.

Through its blanks-detection functionality 355, the Converter detects the purpose of one or more underbar characters in the form ["_"] to be collecting information from the user. These sets of underbars are expressed simply as text blocks and are found in both fillable and non-fillable forms, such as where there are no fillable fields located near the underbars. The Converter detects these cases and creates additional form fields in the digital form so that the user does not have to do this manually.

Through its field-type prediction functionality 360, the Converter predicts which type of digital form field to create from the source field in cases where the type has not already been predicted to be a radio button or checkbox. Because non-fillable forms do not have form fields at all, the Converter utilizes a type-prediction approach that functions without relying on form fields. And even in the case of fillable forms, there are many more field types available in a digital form than are supported natively in the source form, so it is not required to be a direct 1:1 conversion. The Converter uses keywords and sentiment found in the text labels, along with other available information, to help predict the destination type.

The Converter may use machine-learning technology as well as a coded-algorithm version to provide solutions. In one embodiment, a multi-layer machine learning model is trained on a set of text-label keywords and sentiments and mapped to associated field types, enabling the model to predict field types based on text labels found in subsequent documents. In another embodiment, a set of simple lookup functions searches text labels for specific keywords to predict the field type.

In one embodiment, the Converter's mapping of source and destination types for both non-fillable and tillable forms comprises the following:

| Non-Fillable Element | Fillable Element(s) | Nintex Form Field Type |
|---|---|---|
| Text-block | Text-block(label), w/text field | Single-line text-box |
| Text-block | Text-block(label), w/text field | Multi-line text-box |
| Text-block | Text-block(label), w/text field | Date/Time |
| Text-block | Text-block(label), w/text field | Email |
| Text-block | Text-block(label), w/text field | Currency |
| Text-block | Text-block(label), w/text field | Number |
| Text-block | Text-block(label), w/text field | Date/Time |
| Text-block | Text-block(label), w/text field | Geolocation |
| Text-block | Text-block(label), w/text field or Barcode field | Barcode |
| Text-block | Text-block(label) [instructions to attach something] | File-Upload control |
| Text-block | Text-block(label), w/text field or digital signature field | Signature |

Through its specialty-type prediction functionality 365—an extension of the type-conversion functionality—the Converter, in addition to converting to a general type such as text box, may conditionally set additional properties of the digital form field to further refine the conversion. An example of this is a phone-number field, which may simply be a textbox in the digital form, but wherein the Converter sets the input-validation type, placeholder text "(###) ###-####" and input-mask "(999) 999-9999" properties optimize the field for receiving phone numbers.

Through its address-block expansion functionality 370, the Converter looks in regions of the source form to optimize the resulting digital form for collecting full addresses. Source forms sometimes leave only one line or box within which a user is supposed to write multiple address components, or even an entire address. When converting into a digital form, the Converter simplifies this by separating each component of an address into its own field. This improves the ability to validate each field and to use additional online address-verification systems to improve accuracy when the form is being filled out electronically. Rather than forcing the user to manually add the additional address components and modify the converted field, the address-block expansion functionality determines which components are missing and adds them to the digital form automatically. In some embodiments, the Converter utilizes sentiment and keywords for its address-block expansion functionality.

Through its paragraph-prediction functionality 375, the Converter predicts which text lines belong together as a complete paragraph by identifying text lines in a source form both as standalone and as part of the same text block. Without this, text lines are left as separate entities and the resulting digital form's text reflows and wraps to the next line in awkward ways: As soon as a text line has been placed in the digital form, the next text line is often placed below it—not next to it. The Converter overcomes this, thus improving the resulting format of the text on the digital form: rather than a text line being disconnected from the above text line despite it being a continuation of the above the text line, the two become a cohesive whole, resembling a complete paragraph. The digital form's text also reflows more naturally, wrapping to a new line of text only when the width of the form/section is reached for the duration of the block.

Through its text-formatting functionality 380, the Converter detects text-formatting traits in the source form for the purpose of improving text format—e.g., font size and justification—in the digital form. For example, if the digital form supports a wide range of field-label formatting options, the Converter uses more-absolute formatting detection/treatment: standalone text lines or field labels that are of a certain height range in the source form are mapped to specific font sizes in the digital form. Where field labels in the digital form's framework may not support custom formatting, the Converter may affect font size by first establishing a baseline text height for text labels in the source form, and then detecting standalone text on the source form that falls into height ranges that are larger than the baseline field label height. When standalone text receives font-size formatting in the digital form, the effect of enlarged text is relative to the baseline text height of field labels. In another example, the digital form may not support as much flexibility as the source form in terms of text positioning. But the Converter may overcome this, such as when a single line of text is found on the right side of the page, by accommodating formatting in the digital form to approximate the source-form layout. Similarly, a single line of text is sometimes centered in the source page and can be similarly centered in the digital form.

Through its final-conversion functionality 385, the Converter ceases operating on and modifying the intermediate form objects and converts the intermediate objects into the final digital form format. For this, the Converter uses a software adapter component that understands both formats: reading the final state of the remaining intermediate objects and writing the associated destination form elements for each one. The final-conversion functionality 385 supports configurable variations relating to pagination, including a mode where multiple pages are created in the destination form corresponding to each source document page, and controls are placed in the digital form in accordance with the page they were located on in the source form. The final-conversion functionality 385 also supports a mode where all controls from all source-form pages are placed in a single page of the digital form, and the user is free to create new pages and move controls between pages in a separate, subsequent step (after conversion is complete). This flexibility is useful considering pagination requirements are very different for paper and digital media: Source forms are paginated based on physical paper sizes, whereas digital forms can be optimized for a wide variety of digital screens, including ultra-widescreen desktop monitors or very small mobile screens.

Figure 4:
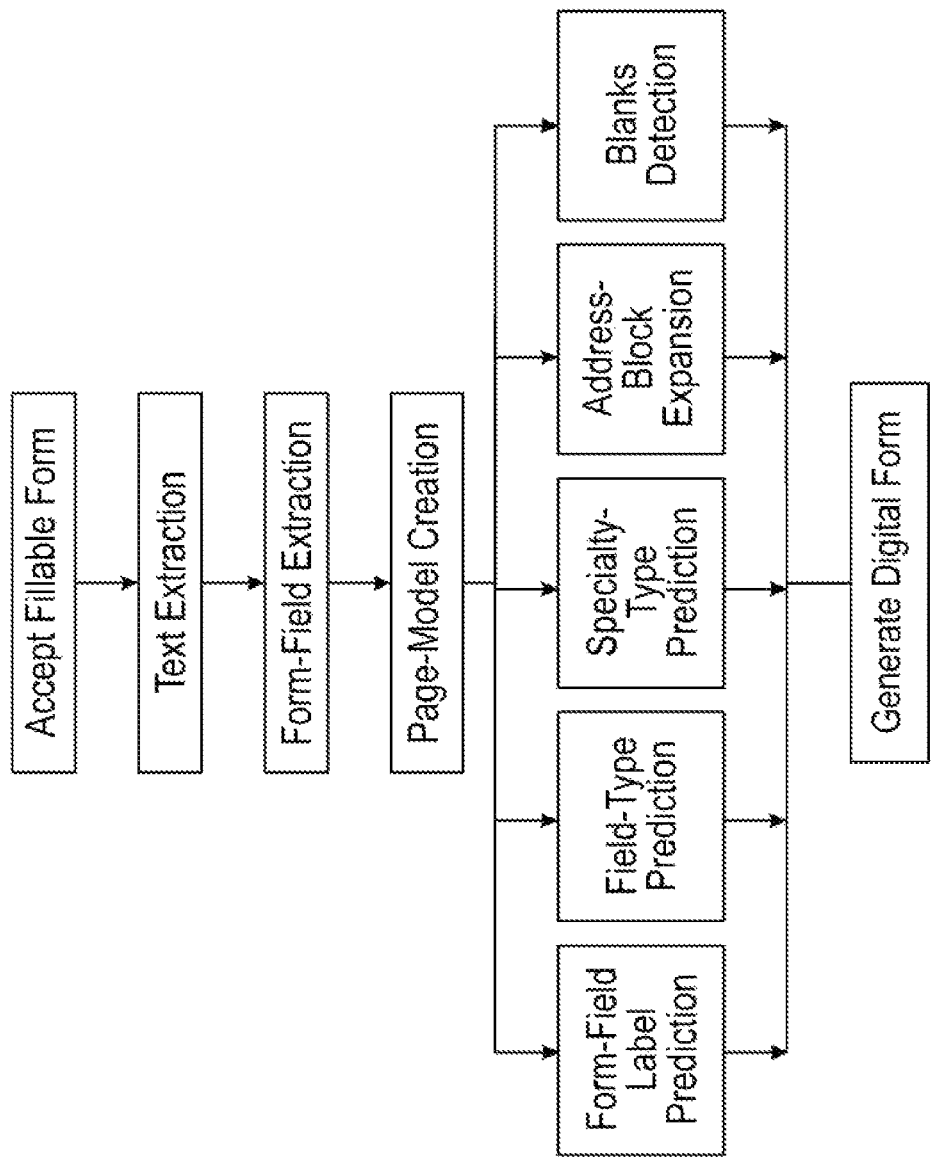
FIG. 4 generally illustrates an embodiment of a flowchart of a method for converting a fillable-form file to a digital form, as disclosed herein.

FIG. 4 generally illustrates an embodiment of a flowchart of a method for converting a fillable-form file to a digital form, as disclosed herein. Specific to fillable forms, the form converter may use the various functionalities listed in FIG. 4—page-model creation, form-field label prediction, field-type prediction, specialty-type prediction, address-block expansion, and blanks detection—to create and generate a digital form.

Figure 5:
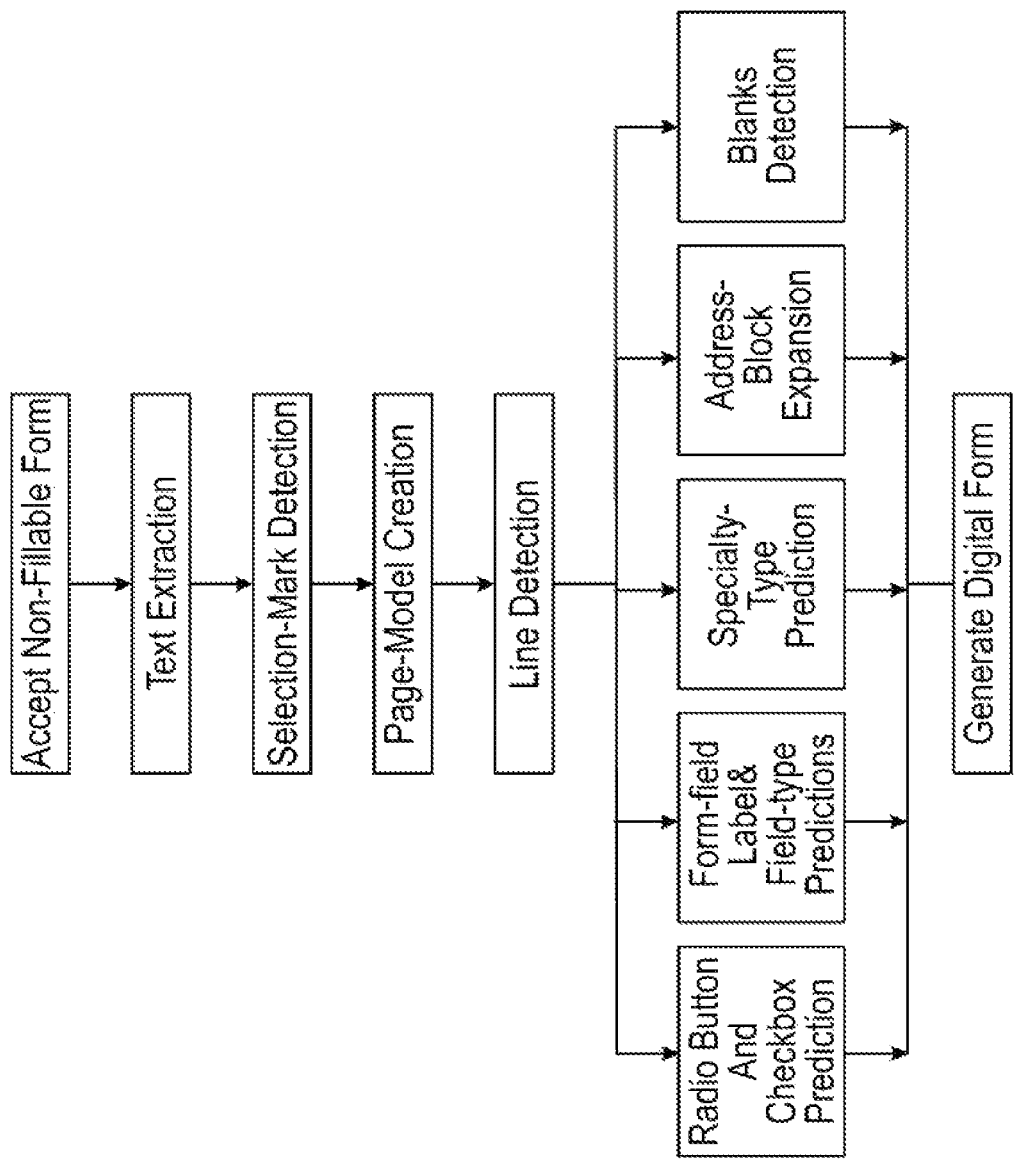
FIG. 5 generally illustrates an embodiment of a flowchart of a method for converting a non-fillable form file to a digital form, as disclosed herein.

FIG. 5 generally illustrates an embodiment of a flowchart of a method for converting a non-fillable form file to a digital form, as disclosed herein. Specific to non-fillable forms, the form converter may use the various functionalities identified in FIG. 5—page-model creation, radio button and checkbox predictions, form-field label prediction, field-type prediction, specialty-type prediction, address-block expansion, and blanks detection—to create and generate a digital form.

Figure 6A:
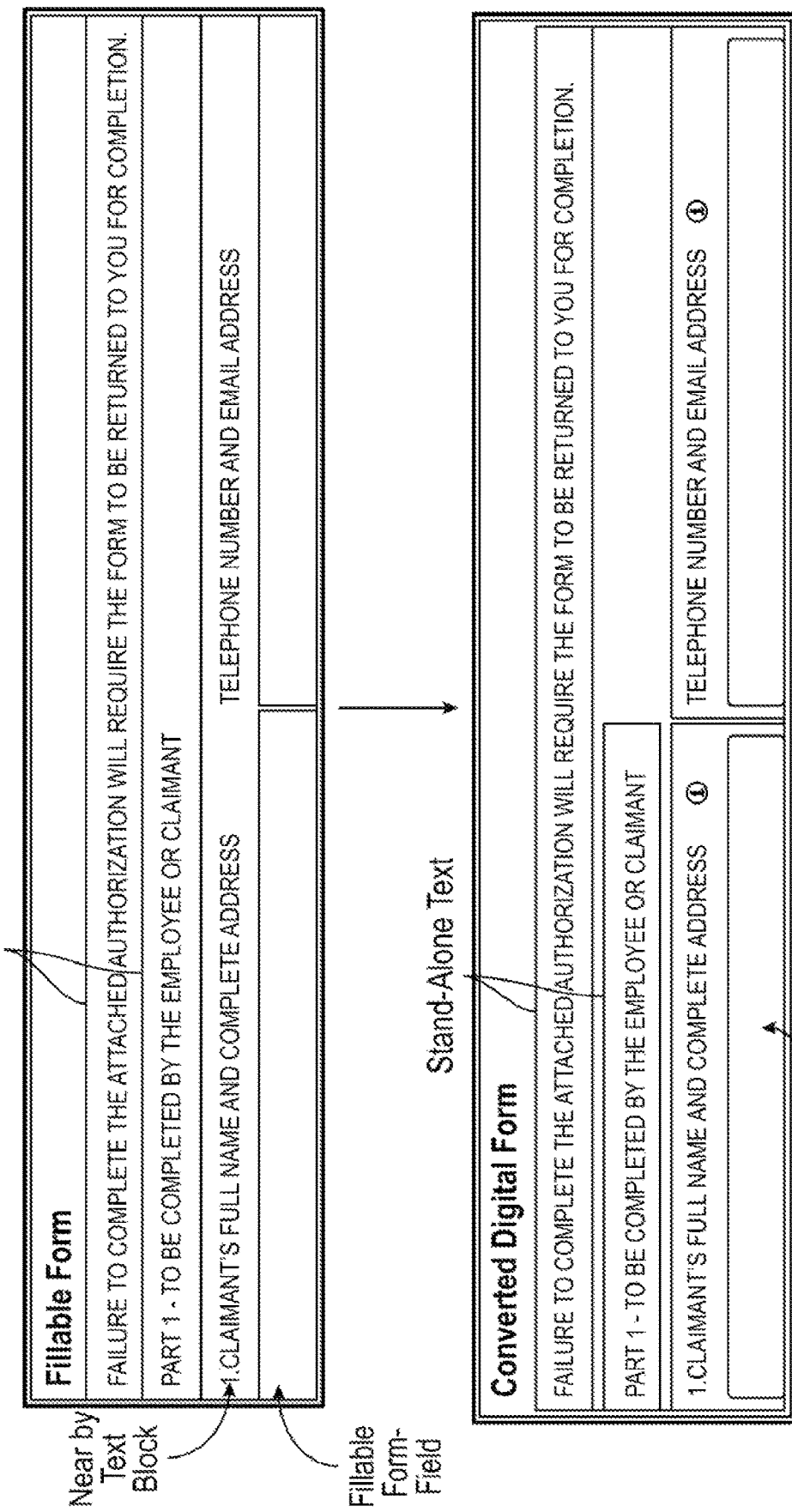
FIG. 6A generally illustrates an embodiment for converting elements of a tillable form file to a digital form, as disclosed herein.

FIG. 6A generally illustrates an embodiment for converting elements of a tillable form file to a digital form, as disclosed herein. As shown in FIG. 6A, a form converter may detect and extract a source forms standalone blocks, form fields, and form-field labels and convert the elements into a digital form that comprises interactive controls reflecting the original elements.

Figure 6B:
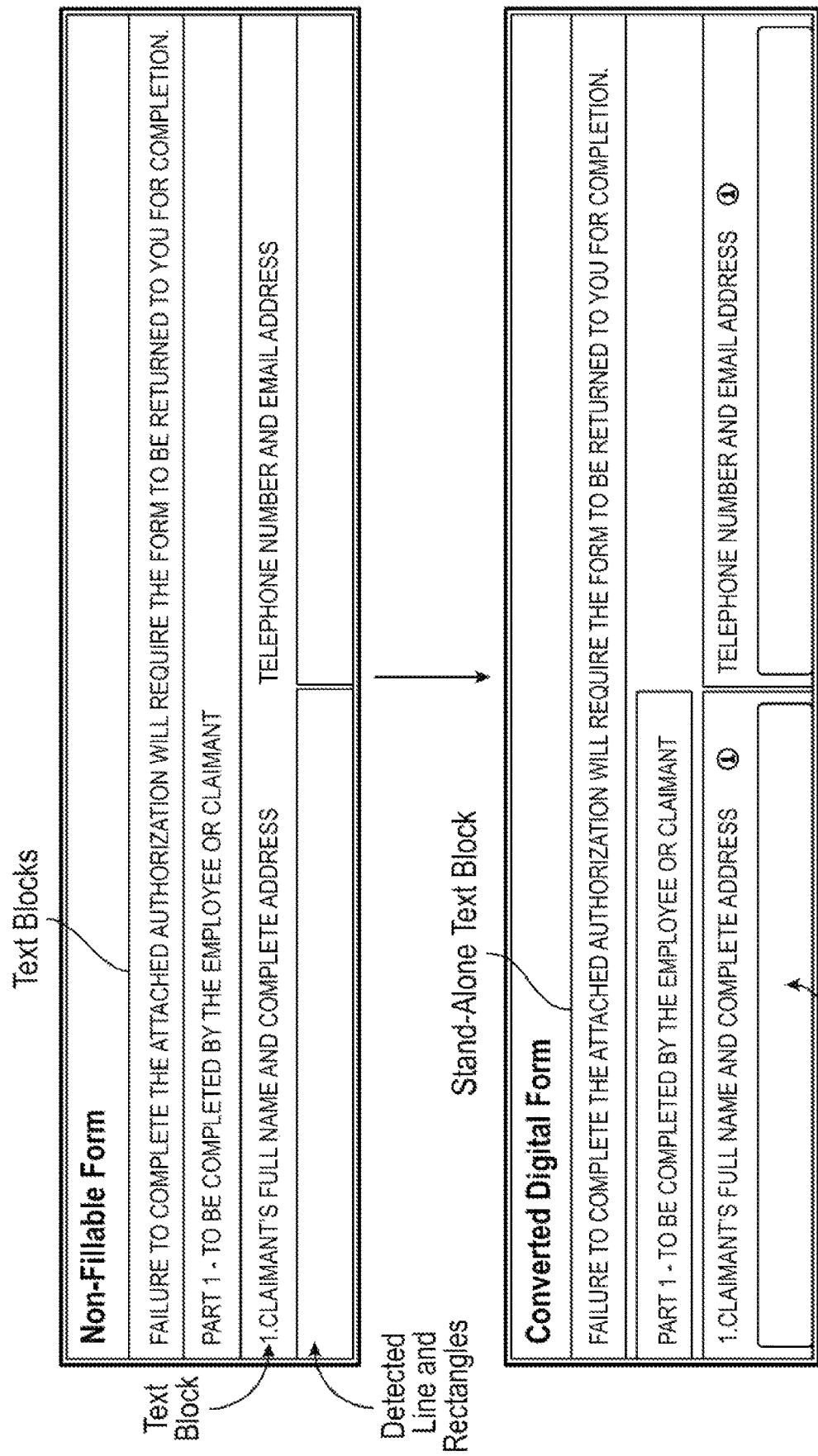
FIG. 6B generally illustrates an embodiment for converting elements of a fillable form file to a digital form, as disclosed herein.

Similarly, FIG. 6B generally illustrates an embodiment for converting elements of a fillable form file to a digital form, as disclosed herein. As shown in FIG. 6B, a form converter may detect and extract a source form's standalone blocks, form fields, and form-field labels and convert the elements into a digital form that comprises interactive controls reflecting the original elements.

Figure 7A:
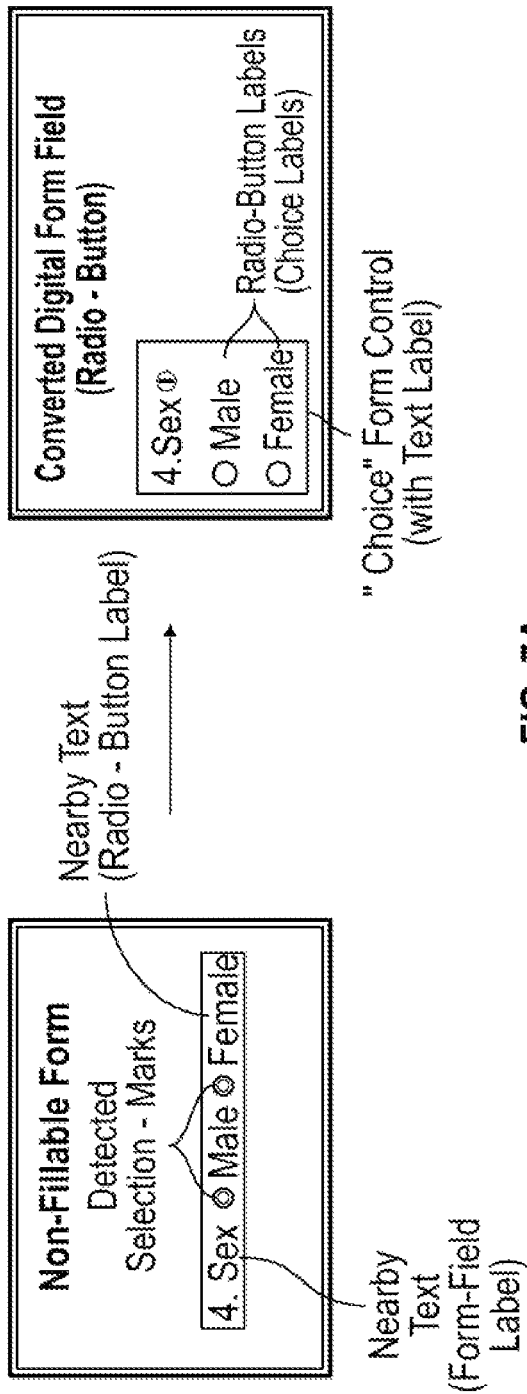
FIG. 7A generally illustrates an embodiment for converting elements of a non-fillable form file to a digital form, as disclosed herein.

FIG. 7A generally illustrates an embodiment for converting elements of a non-fillable form file to a digital form, as disclosed herein. As shown in FIG. 7A, a form converter may detect and extract a source form's selection marks, radio-button labels, and nearby text and convert the elements into a digital form that comprises interactive controls reflecting the original elements.

Figure 7B:
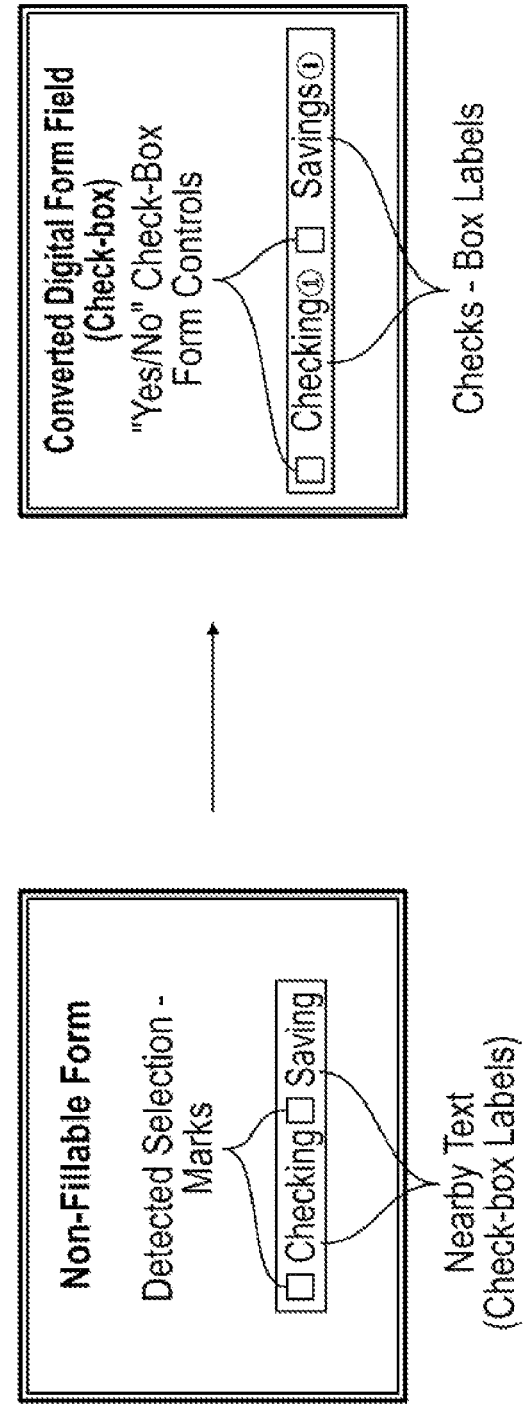
FIG. 7B generally illustrates an embodiment for converting elements of a non-fillable form file to a digital form, as disclosed herein.

FIG. 7B generally illustrates an embodiment for converting elements of a non-fillable form file to a digital form, as disclosed herein. As shown in FIG. 7B, a form converter may detect and extract a source form's selection marks and nearby text and convert the elements into a digital form that comprises interactive controls reflecting the original elements.

Figure 8:
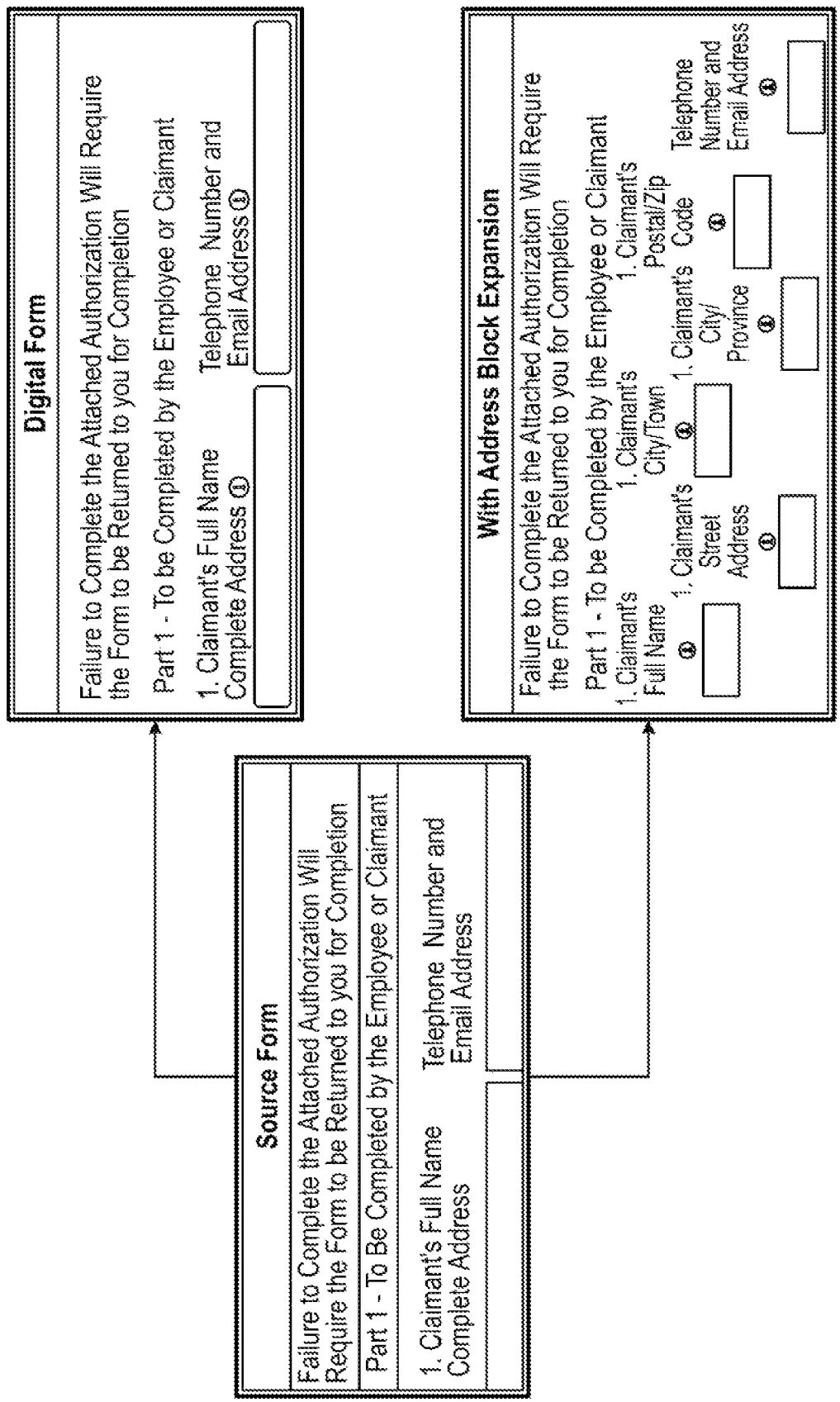
FIG. 8 generally illustrates an embodiment for converting elements of an electronic file format to a digital form, as disclosed herein.

FIG. 8 generally illustrates an embodiment for converting elements of an electronic file format to a digital form, as disclosed herein. As shown in FIG. 8, a form converter may detect and extract a source form's element seeking address information and convert it either simplified interactive controls or more-detailed interactive controls that expand on the address-request element.

Figure 9:
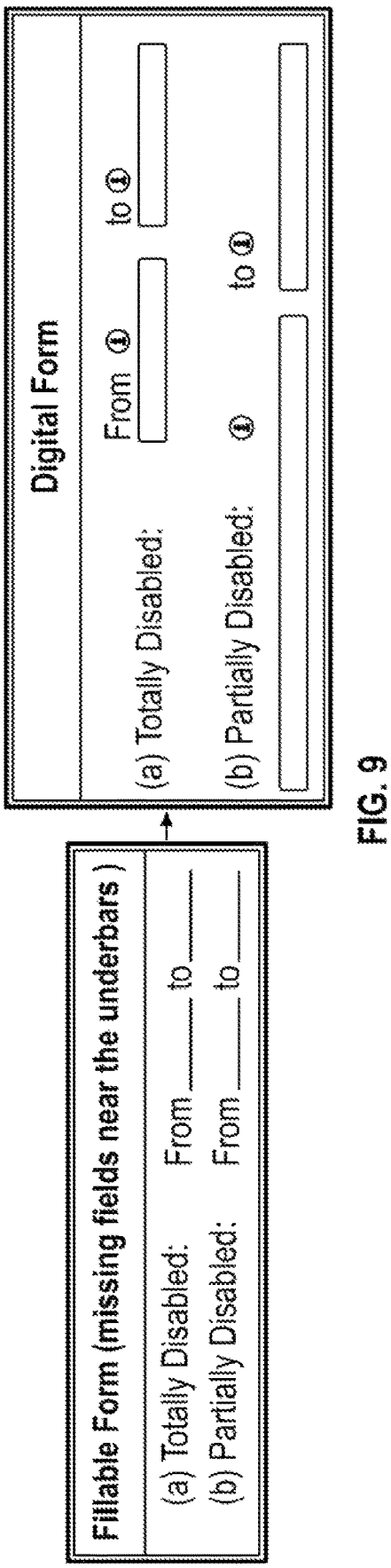
FIG. 9 generally illustrates an embodiment for convening elements of a fillable-form file to a digital form, as disclosed herein.

FIG. 9 generally illustrates an embodiment for converting elements of a fillable-form file to a digital form, as disclosed herein. As shown in FIG. 9, a form converter may detect and extract the positions of blank lines and nearby text and convert the elements into a digital form that comprises interactive controls reflecting a request for information that the blank lines originally sought.

FIG. 10 generally illustrates a form converter converting elements of an electronic file format to a digital form, as disclosed herein. As shown in FIG. 10, a form converter may utilize line-detection functionality to improve conversion of non-fillable forms by classifying text as either being a form-field label or standalone text. In one embodiment, the Converter accomplishes this by creating an image from the rendered page and using a computer-vision library to detect horizontal and vertical lines on the page. Afterwards, the Converter may assemble collections based on proximity of the following lines to each other: standalone horizontal lines, standalone vertical lines, connected horizontal lines, and connected vertical lines. The Converter then constructs a set of connected rectangles from the connected horizontal/vertical lines (represented in FIG. 10 by dashed lines). And it constructs a set of imaginary rectangles, positioned just above the standalone horizontal lines (represented by dotted lines). The Converter then classifies text blocks in accordance with their relative location to these rectangles: text blocks within a connected rectangle arc likely to be determined a form-field label, and text blocks an imaginary rectangle (above, below, next to), arc likely determined to be a form-field label. The Converter classifies remaining text blocks to likely be standalone text.

Figure 11:
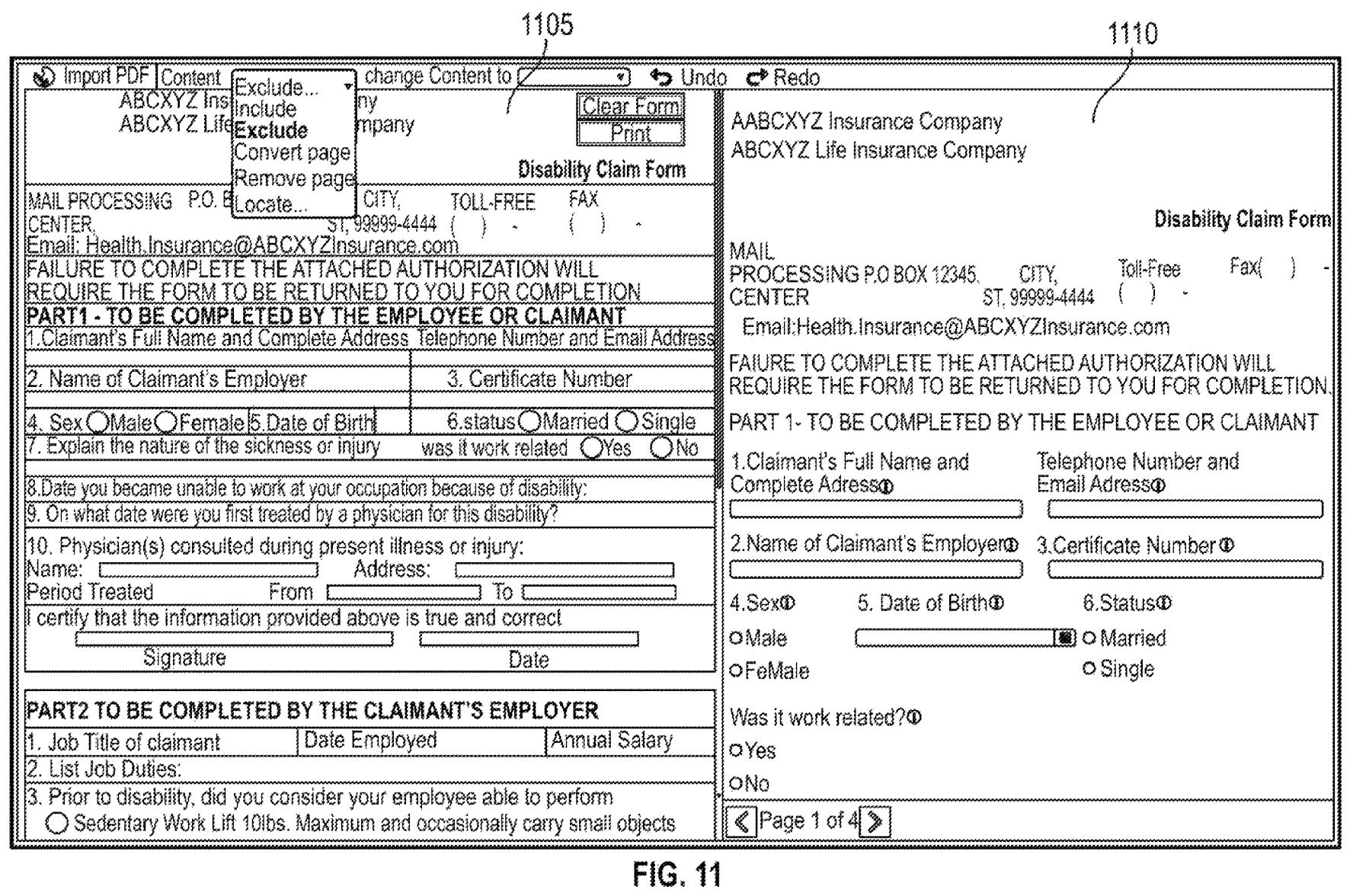

FIG. 11 generally illustrates a form converter enabling user interaction for converting elements of an electronic file format to a digital form, as disclosed herein. As shown in FIG. 11, the form converter can provide the capability for viewing both the original source form 1105 and the resulting digital form 1110, and further provide the capability for interacting with the Converter to modify the conversion and/or override its default predictions. For example, a user may select one or multiple fields in the source form for the purpose of including or excluding the selected fields, or for overriding field-type predictions for fields in the digital form.

Figure 12:
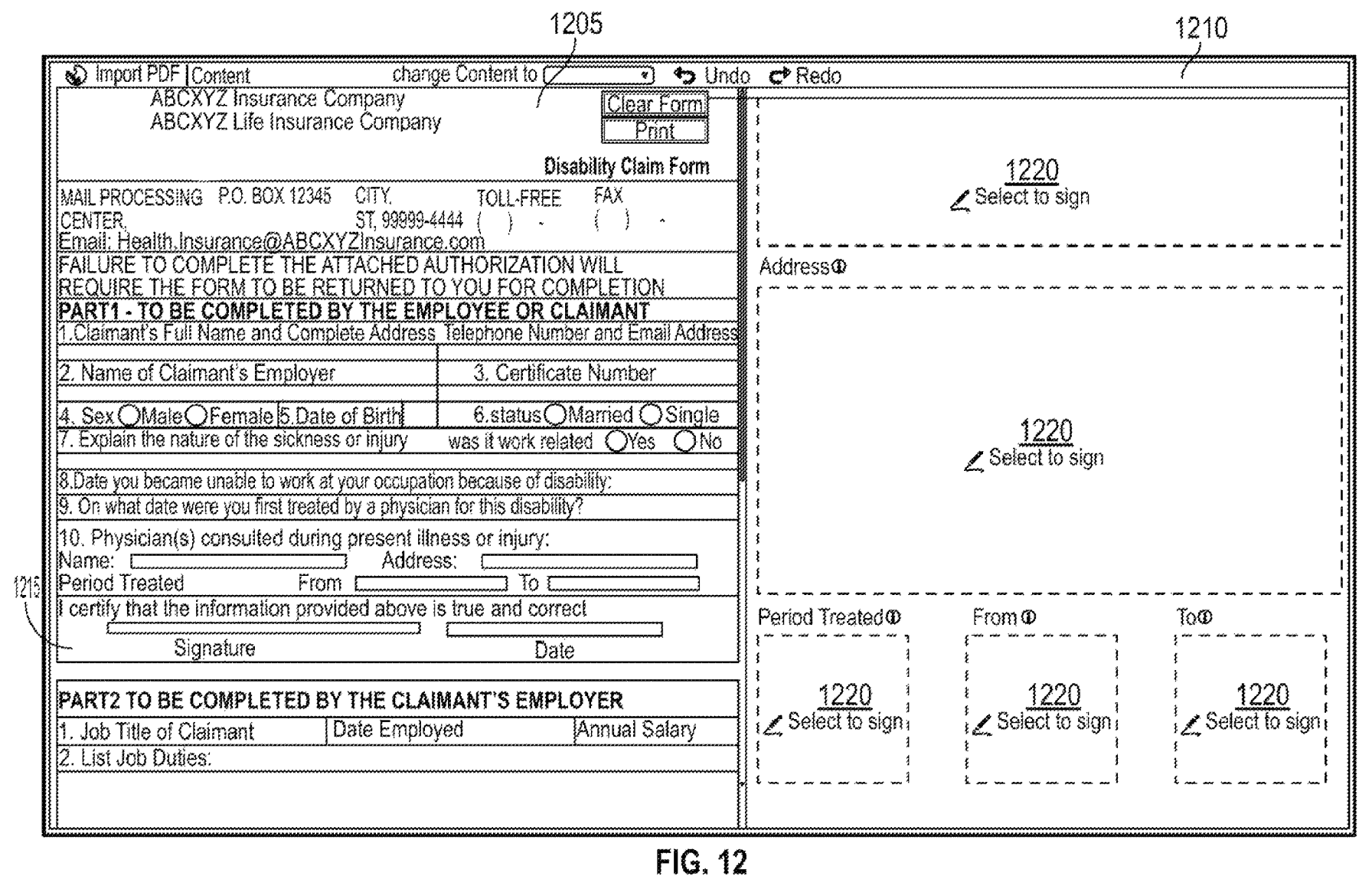

FIG. 12 generally illustrates a form converter enabling user interaction for converting elements of an electronic file format to a digital form, as disclosed herein. The form converter can provide the capability for revising the functionality of the source form 1205 when converting the source form 1205 into a digital form 1210. As shown in FIG. 12, the Converter enables selection of multiple fields and changing the purpose of or functionality of the selected fields. For example, the Converter enables a user to apply the signature-block functionality 1215 to multiple fields of the source form and convert them to a different type of field, such as a signature field 1220.

In other embodiments, the Converter enables the selection of multiple fields in the source form to then take action on the selected fields, which may include but is not limited to: grouping multiple text lines into a single destination text block (specifying a paragraph in the digital form); creating a radio-button group; and specifying a repeating section in the digital form (a block of form fields that corresponds to a record in a collection, allowing users to "add" a new record in the destination).

When the digital form is finalized, it may function in multiple ways. For example, it may function as a standalone form serving the same purpose as its source-form counterpart. It may function as a starting event in a workflow, wherein when a user finishes out the digital form, the data entered into the digital form is immediately available to the rest of the workflow. It may also be used by web-based collaborative platforms for collecting and validating user input. In any of these or other applications of the digital form, the digital form may send data inputted into it to a separate location for storage, such as a database.

Figure 13:
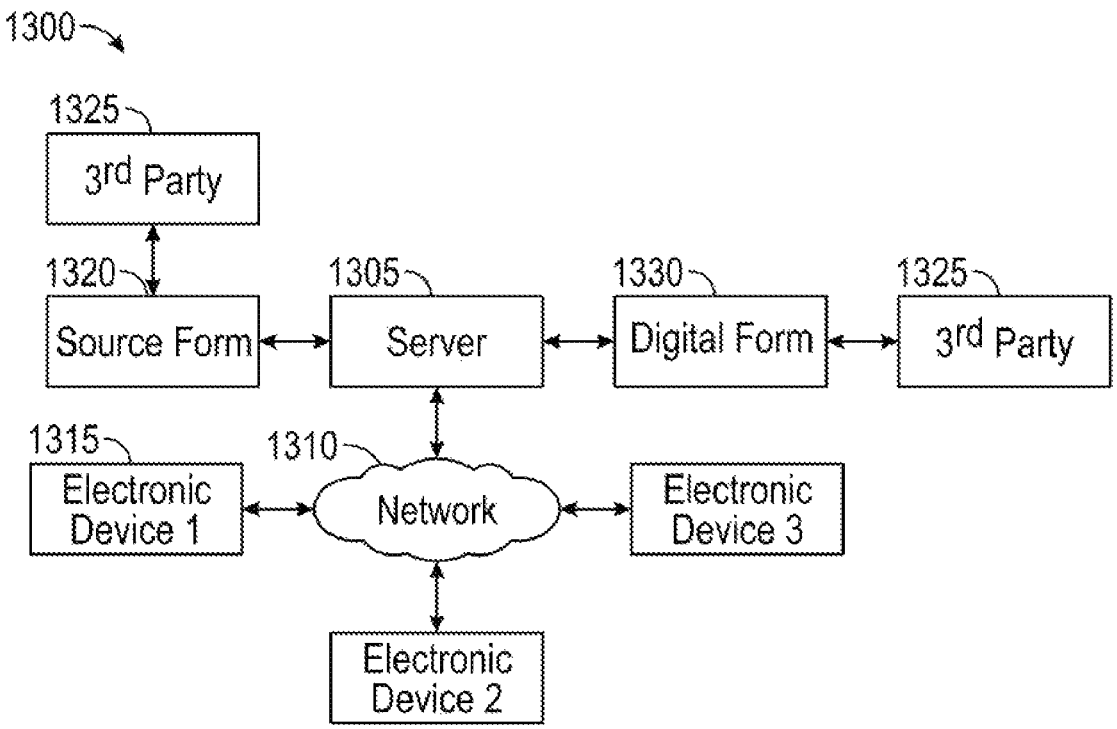
FIG. 13 is a functional block diagram generally illustrating an embodiment of a network system of a form-convener system as disclosed herein.

FIG. 13 is a functional block diagram generally illustrating an embodiment of a network system 1300 of a form-converter system. Shown in FIG. 13 is a form-converter server 1305 accessible over a local area networks or a wide area network 1310, such as the Internet, by one or more user electronic devices 1315, including for example, laptops, smartphones, computers, tablets, and other computing devices that can access the local area network or a wide area network where the form-converter server 1305 resides. The form-converter server 1305 hosts one or more source forms 1320 and/or one or more digital forms 1330 (the source forms 1320 and digital forms 1330 may also be accessible to users). And the form-converter server 1305 is remotely accessible by a number of the devices 1315. In normal operation, an electronic device 1315 connects with the form-converter server 1315 to interact with the source form 1320 or digital form 1330. The digital form 1330 may employ several connectors to interact with third-party data, services, or applications 1325 (e.g., Salesforce™, Facebook™, Twitter™, various cloud services, or any other data or service accessible through a network), including local area networks (for example a local application that is exposed as a WebService residing on-premises) or wide area networks (for example the Internet).

Figure 14:
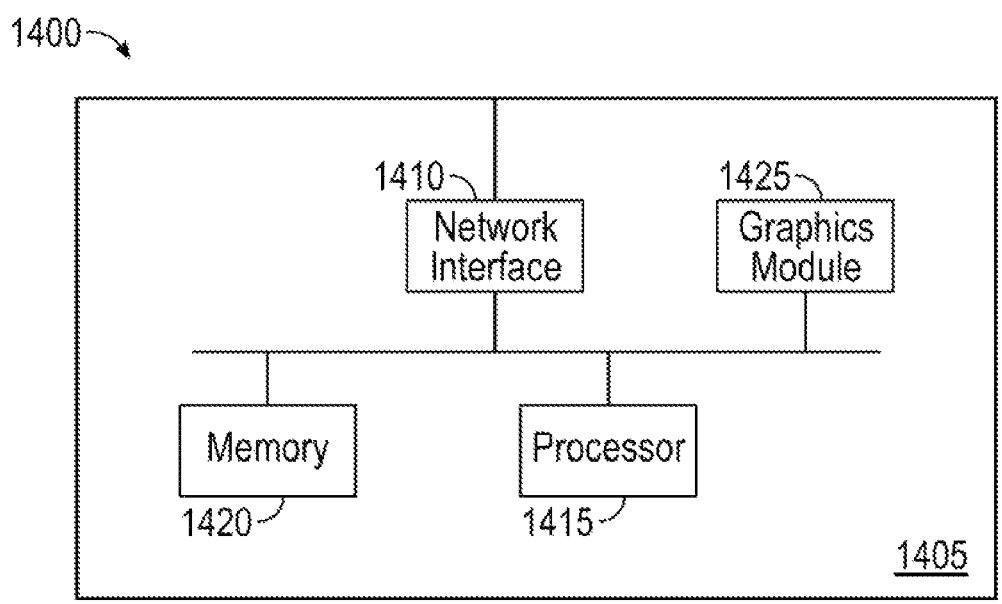
FIG. 14 is a functional block diagram generally illustrating an embodiment of an electronic device system for converting an electronic file format to a digital form as disclosed herein.

FIG. 14 is a functional block diagram generally illustrating an embodiment of an electronic device system for converting an electronic file format to a digital form as disclosed herein. The electronic device 1405 may be coupled to a server via a network interface 1410. The electronic device 1405 generally comprises a processor 1415, a memory 1420, and a graphics module 1425. The electronic device 1405 is not limited to any particular configuration or system.

Other embodiments may include combinations and sub-combinations of features described or shown in the several figures, including for example, embodiments that are equivalent to providing or applying a feature in a different order than in a described embodiment, extracting an individual feature from one embodiment and inserting such feature into another embodiment; removing one or more features from an embodiment; or both removing one or more features from an embodiment and adding one or more features extracted from one or more other embodiments, while providing the advantages of the features incorporated in such combinations and sub-combinations. As used in this paragraph. "feature" or "features" can refer to structures and/or functions of an apparatus, article of manufacture or system, and/or the steps, acts, or modalities of a method.

References throughout this specification to "one embodiment," "an embodiment," "an example embodiment" etc., indicate that the embodiment described may include a particular feature, structure, or characteristic, but every embodiment may not necessarily include that particular feature, structure, or characteristic. Moreover, such phrases are not necessarily referring to the same embodiment. Further, when a particular feature, structure, or characteristic is described in connection with one embodiment, it will be within the knowledge of one skilled in the art to affect such feature, structure, or characteristic in connection with other embodiments whether or not explicitly described.

Unless the context clearly indicates otherwise (1) the word "and" indicates the conjunctive; (2) the word "or" indicates the disjunctive; (3) when the article is phrased in the disjunctive, followed by the words "or both," both the conjunctive and disjunctive are intended; and (4) the word "and" or "or" between the last two items in a series applies to the entire series.

Where a group is expressed using the term "one or more" followed by a plural noun, any further use of that noun to refer to one or more members of the group shall indicate both the singular and the plural form of the noun. For example, a group expressed as having "one or more members" followed by a reference to "the members" of the group shall mean "the member" if there is only one member of the group.

The term "a" or "an" entity refers to one or more of that entity. As such, the terms "a" (or "an"). "one or more" and "at least one" can be used interchangeably herein. It is also to be noted that the terms "comprising", "including", and "having" can be used interchangeably.

What is claimed:

1. A method for automatically converting an electronic file format into a digital form, comprising:
   receiving, by a computing device, the electronic file format,
   wherein the electronic file format comprises three or more elements,
   wherein the three or more elements comprise at least one form field, at least one form-field label, and at least one standalone text block;
   detecting, by the computing device, the three or more elements of the electronic file format;
   predicting, by the computing device, a set of element properties for each of the detected three or more elements;

determining at least one missing element in the three or more elements of the electronic file format based on the predicted set of element properties;

differentiating, based at least in part on the detecting, between the at least one form field, the at least one form-field label, and the at least one standalone text block;

extracting, by the computing device, the detected three or more elements;

scaling, by the computing device, the electronic file format to identify locations of the detected three or more elements;

converting, by the computing device, the extracted three or more elements into a converted three or more elements,
wherein the converted three or more elements comprise at least one converted form field, at least one converted form-field label, and at least one converted standalone text block,
wherein the at least one converted form field comprises a display format on the digital form that is capable of being dynamically adjusted by a set of element formatting traits determined from the predicted set of element properties; and generating, by the computing device, the digital form,
wherein the digital form comprises the converted three or more elements populating locations resembling the locations of the detected three or more elements of the electronic file format, and
wherein the digital form comprises a converted element created for the at least one missing element populating a location based on at least one location from the locations of the detected three or more elements.

2. The method of claim 1, wherein the electronic file format is one of a portable document format, a joint photographic experts group, a portable network graphics, a graphics interchange format, a scalable vector graphics, a tag image file format, or a word-processor document.

3. The method of claim 2, wherein the electronic file format is a fillable form,
wherein the at least one standalone text block comprises text objects;
wherein extracting the detected at least one standalone text block comprises obtaining the text objects directly from the electronic file format; and
wherein converting the three or more elements comprises converting the text objects into the at least one converted standalone text block, wherein the at least one converted standalone text block is a uniform, standardized set of text line elements.

4. The method of claim 2, wherein the electronic file format is a non-fillable form,
wherein the at least one standalone text block comprises embedded images;
wherein extracting the detected at least one standalone text block comprises using optical character recognition to extract the embedded images from the electronic file format; and
wherein converting the three or more elements comprises converting the extracted embedded images into the at least one converted standalone text block, wherein the at least one converted standalone text block is a uniform, standardized set of text line elements.

5. The method of claim 2, wherein the electronic file format is a fillable form;
wherein the at least one converted form field is an executable form field; and wherein converting the three or more elements further comprises searching an area surrounding the extracted at least one form field for the at least one form-field label and converting the at least one form-field label into the at least one converted form-field label.

6. The method of claim 2, wherein the electronic file format is a non-fillable form;
wherein detecting the three or more elements of the electronic file format comprises using an image of the electronic file format to detect sets of line-based objects;
wherein converting the extracted three or more elements comprises converting the detected sets of line-based objects into one or both of the at least one converted form-field label and the at least one converted standalone text block.

7. The method of claim 2, wherein the electronic file format is a non-fillable form;
wherein detecting the three or more elements of the electronic file format further comprises using form recognizer to detect a selection mark;
wherein extracting the detected three or more elements further comprises obtaining the selection mark and identifying a location of the selection mark on the electronic file format;
wherein converting the three or more elements further comprises converting the selection mark into a converted selection mark; and
wherein the generated digital form further comprises the converted selection mark, wherein the converted selection mark has a location resembling the location of the selection mark on the electronic file format.

8. A system for automatically converting an electronic file format into a digital form, comprising:
a computer system having a hardware processor and a physical memory using executable instructions that, as a result of being executed by the hardware processor, cause the computer system to,
receive the electronic file format,
wherein the electronic file format comprises three or more elements,
wherein the three or more elements comprise at least one form field, at least one form-field label, and at least one standalone text block;
detect the three or more elements of the electronic file format;
predict, using a machine learning model, a set of element properties for each of the detected three or more elements;
determine at least one missing element in the three or more elements of the electronic file format based on the predicted set of element properties;
differentiate, based at least in part on the detected three or more elements, between the at least one form field, the at least one form-field label, and the at least one standalone text block;
extract the detected three or more elements;
scale the electronic file format to identify locations of the detected three or more elements;
convert the extracted three or more elements into a converted three or more elements,
wherein the converted three or more elements comprise at least one converted form field, at least one converted form-field label, or and at least one converted standalone text block,
wherein the at least one converted form field comprises a display format on the digital form that is capable of being dynamically adjusted by a set of element formatting traits determined from the predicted set of element properties generated via the machine learning model; and generate the digital form,
    wherein the digital form comprises the converted three or more elements,
    populating locations resembling the locations of the detected three or more elements of the electronic file format, and
    wherein the digital form comprises a converted element created for the at least one missing element populating a location based on at least one location from the locations of the detected three or more elements.

9. The system of claim 8, wherein the electronic file format is one of a portable document format, a joint photographic experts group, a portable network graphics, a graphics interchange format, a scalable vector graphics, a tag image file format, or a word-processor document.

10. The system of claim 8, wherein the electronic file format is a fillable form,
    wherein the at least one standalone text block corresponds to at least one text field embedded within the fillable form;
    wherein extracting the detected at least one standalone text block comprises obtaining electronically filled text objects directly from the at least one embedded text field;
    wherein converting the three or more elements comprises converting the electronically filled text objects into the at least one converted standalone text block, and
    wherein the at least one converted standalone text block is a uniform, standardized set of text line elements.

11. The system of claim 9, wherein the electronic file format is a fillable form;
    wherein the at least one converted form field is an executable form field; and
    wherein converting the three or more elements further comprises searching an area surrounding the extracted at least one form field for the at least one form-field label and converting the at least one form-field label into the at least one converted form-field label.

12. The system of claim 9, wherein the electronic file format is a non-fillable form;
    wherein detecting the three or more elements of the electronic file format comprises using an image of the electronic file format to detect sets of line-based objects;
    wherein converting the extracted three or more elements comprises converting the detected sets of line-based objects into one or both of the at least one converted form-field label and the at least one converted standalone text block.

13. The system of claim 9, wherein the electronic file format is a non-fillable form;
    wherein detecting the three or more elements of the electronic file format further comprises using form recognizer to detect a selection mark;
    wherein extracting the detected three or more elements further comprises obtaining the selection mark and identifying a location of the selection mark on the electronic file format;
    wherein converting the three or more elements further comprises converting the selection mark into a converted selection mark; and wherein the generated digital form further comprises the converted selection mark, wherein the converted selection mark has a location resembling the location of the selection mark on the electronic file format.

14. A computing device comprising:
a processor; and
a non-transitory, computer-readable medium operably coupled to the processor, the computer-readable medium having computer-readable instructions stored thereon that, when executed by the processor, cause the computing device to,
    receive an electronic file format,
        wherein the electronic file format comprises three or more elements,
        wherein the three or more elements comprise at least one form field, at least one form-field label, and at least one standalone text block;
    detect the three or more elements of the electronic file format;
    predict a set of element properties for each of the detected three or more elements;
    determine at least one missing element in the three or more elements of the electronic file format based on the predicted set of element properties;
    differentiate, based at least in part on the detected three or more elements, between the at least one form field, the at least one form-field label, and the at least one standalone text block;
    extract the detected three or more elements;
    scale the electronic file format to identify locations of the detected three or more elements;
    convert the extracted three or more elements into a converted three or more elements,
        wherein the converted three or more elements comprise at least one converted form field, at least one converted form-field label, and at least one converted standalone text block,
        wherein the at least one converted form field comprises a display format that is capable of being dynamically adjusted by a set of element formatting traits determined from the predicted set of element properties; and
    generate a digital form,
        wherein the digital form comprises the converted three or more elements populating locations resembling the locations of the detected three or more elements of the electronic file format, and
        wherein the digital form comprises a converted element created for the at least one missing element populating a location based on at least one location from the locations of the detected three or more elements.

15. The device of claim 14, wherein the electronic file format is one of a portable document format, a joint photographic experts group, a portable network graphics, a graphics interchange format, a scalable vector graphics, a tag image file format, or a word-processor document.

16. The device of claim 15,
    wherein the at least one standalone text block comprises at least one of: text objects or embedded images;
    wherein, when the at least one standalone text block comprises text objects, extracting the detected at least one standalone text block comprises obtaining the text objects directly from the electronic file format;
    wherein, when the at least one standalone text block comprises embedded images, extracting the detected at least one standalone text block comprises using optical character recognition to extract the embedded images from the electronic file format; and wherein converting the three or more elements comprises converting the at least one of text objects or embedded images into the converted standalone text block, wherein the at least one converted standalone text block is a uniform, standardized set of text line elements.

17. The device of claim 15, wherein the electronic file format is a fillable form;

wherein the at least one converted form field is an executable form field; and wherein converting the three or more elements further comprises searching an area surrounding the extracted at least one form field for the at least one form-field label and converting the at least one form-field label into the at least one converted form-field label.

18. The device of claim 15, wherein the electronic file format is a non-fillable form;

wherein detecting the three or more elements of the electronic file format comprises using an image of the electronic file format to detect sets of line-based objects;

wherein converting the extracted three or more elements comprises converting the detected sets of line-based objects into one or both of the at least one converted form-field label and the at least one converted standalone text block.

19. The method of claim 1, wherein the at least one converted form field comprises a plurality of converted form field elements; and wherein generating the digital form further comprises each converted form field element in the plurality of converted form field elements populating a unique location on the digital form.

20. The system of claim 8, wherein the at least one converted form field comprises a plurality of converted form field elements; and wherein generating the digital form further comprises each converted form field element in the plurality of converted form field elements populating a unique location on the digital form.

* * * * *